(12) United States Patent
Park et al.

(10) Patent No.: US 7,259,812 B2
(45) Date of Patent: Aug. 21, 2007

(54) IN PLANE SWITCHING MODE LIQUID CRYSTAL DISPLAY DEVICE HAVING 4-PIXEL STRUCTURE

(75) Inventors: Jong-Jin Park, Gyeonggi-Do (KR); Ki-Bok Park, Gyeonggi-Do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/825,438

(22) Filed: Apr. 16, 2004

(65) Prior Publication Data

US 2004/0263748 A1 Dec. 30, 2004

(30) Foreign Application Priority Data

Jun. 30, 2003 (KR) .................. 10-2003-0043978

(51) Int. Cl.
*G02F 1/1335* (2006.01)
*G02F 1/1343* (2006.01)

(52) U.S. Cl. ..................... 349/106; 349/141

(58) Field of Classification Search ............. 349/141, 349/106, 109
See application file for complete search history.

(56) References Cited

U.S. PATENT DOCUMENTS

| 5,142,392 | A | * | 8/1992 | Ueki et al. ............... 349/111 |
| 5,598,285 | A | | 1/1997 | Kondo et al. |
| 5,642,176 | A | * | 6/1997 | Abukawa et al. .......... 349/106 |
| 5,757,452 | A | * | 5/1998 | Masaki et al. ............ 349/110 |
| 5,777,707 | A | * | 7/1998 | Masaki et al. ............ 349/110 |
| 5,838,037 | A | | 11/1998 | Masutani et al. |
| 5,946,060 | A | | 8/1999 | Nishiki et al. |
| 5,990,987 | A | | 11/1999 | Tanaka |
| 6,028,653 | A | | 2/2000 | Nishida |
| 6,097,454 | A | | 8/2000 | Zhang et al. |
| 6,147,728 | A | * | 11/2000 | Okumura et al. .......... 349/106 |
| 6,177,214 | B1 | * | 1/2001 | Yokoyama et al. ........... 430/7 |
| 6,256,081 | B1 | * | 7/2001 | Lee et al. ................ 349/141 |
| 6,266,116 | B1 | * | 7/2001 | Ohta et al. ............... 349/141 |

(Continued)

FOREIGN PATENT DOCUMENTS

JP 2001-154636 6/2001

*Primary Examiner*—James A. Dudek
(74) *Attorney, Agent, or Firm*—McKenna Long & Aldridge LLP (57) ABSTRACT

An IPS mode liquid crystal display device includes a first set of pixels of different colors, each of the pixels having a data line along a side thereof and a gate line along a side thereof, wherein one of the pixels is a white (W) pixel; a second set of pixels of different colors, each of the pixels having a data line along a side thereof and a gate line along a side thereof, wherein one of the pixels is a white (W) pixel; wherein the first set of pixels and the second set of pixels is adjacent to each other. In another embodiment, the IPS LCD includes a plurality of R (Red), G (Green), B (Blue) and W (White) pixels defined by a plurality of gate lines and a plurality of data lines; a driving element in the pixel; and at least one pair of electrodes disposed in the pixel to form a horizontal electric field, wherein the R, G, B, and W pixels are arranged in a zigzag pattern in a data line direction, and each of R, G, B, and W pixels is arranged to be symmetric with respect to the gate line to adjacent R, G, B, and W pixels.

37 Claims, 8 Drawing Sheets

U.S. PATENT DOCUMENTS

| | | | |
|---|---|---|---|
| 6,266,166 B1 | 7/2001 | Katsumata et al. | |
| 6,288,763 B1 * | 9/2001 | Hirota | 349/141 |
| 6,297,866 B1 * | 10/2001 | Seo et al. | 349/141 |
| 6,459,465 B1 * | 10/2002 | Lee | 349/141 |
| 6,545,658 B2 * | 4/2003 | Ohta et al. | 345/98 |
| 6,600,542 B2 * | 7/2003 | Kim et al. | 349/141 |
| 6,603,526 B2 * | 8/2003 | Kim et al. | 349/141 |
| 6,707,067 B2 * | 3/2004 | Zhong et al. | 257/59 |
| 6,710,836 B2 * | 3/2004 | Lee | 349/141 |
| 6,774,956 B2 * | 8/2004 | Ono et al. | 349/39 |
| 6,784,965 B2 * | 8/2004 | Kim et al. | 349/141 |
| 6,795,151 B2 * | 9/2004 | Lee | 349/141 |
| 6,798,484 B2 * | 9/2004 | Yang et al. | 349/141 |
| 6,816,221 B2 * | 11/2004 | Oke et al. | 349/141 |
| 6,833,888 B2 * | 12/2004 | Song et al. | 349/106 |
| 2001/0019382 A1 * | 9/2001 | Song et al. | 349/106 |
| 2004/0135937 A1 * | 7/2004 | Lee et al. | 349/106 |
| 2005/0018108 A1 * | 1/2005 | Okumura et al. | 349/106 |

* cited by examiner

IN PLANE SWITCHING MODE LIQUID CRYSTAL DISPLAY DEVICE HAVING 4-PIXEL STRUCTURE

This application claims the benefit of Korean Patent Application No. 2003-43978, filed on Jun. 30, 2003, which is hereby incorporated by reference for all purposes as if fully set forth herein.

BACKGROUND OF THE INVENTION

1. Field of the Invention

The present invention relates to an in-plane switching mode liquid crystal display device, particularly to the in-plane switching mode liquid crystal display device of 4-pixels structure including R (Red), G (Green), B (Blue) and W (White) pixels having compensated main viewing angle to improve brightness and viewing angle characteristic.

2. Discussion of the Related Art

A light, thin, small flat panel display device have been actively studied, because such display devices may be used in various portable electronic devices such as mobile phones, PDAs (Personal Digital Assistants) and notebook computers, which have received great interest recently. An LCD (Liquid Crystal Display), a PDP (Plasma Display Panel), an FED (Field Emission Display), a VFD (Vacuum Fluorescent Display), or the like have been developed as the flat panel display device. Of these flat panel display devices, the LCD is used because of the improved mass-production technique, the simplified driving system and the high picture quality.

The LCD device has various display modes according to the arrangement of the liquid crystal molecules. Among these display modes, a TN mode (Twisted Nematic mode) LCD device is used because of good display characteristic of the white and black colors, fast response time, and low driving voltage. In the TN mode LCD device, the liquid crystal molecules arranged substantially parallel to the surface of the substrate align in the substantial vertical direction to the surface of the substrate when voltage is applied. When the voltage is applied, thus, the viewing angle is narrow because of the refractive anisotropy of the liquid crystal molecules.

To solve the viewing angle problem, LCD devices of various modes having a wide viewing angle characteristic are used, and of them, an in-plane switching mode LCD device is actually used for mass production. The IPS mode liquid crystal display device has an improved viewing angle characteristic by forming a horizontal electric field that is substantially parallel with the surface of the substrate and thus aligning the liquid crystal molecules in a plane.

Figure 1A:
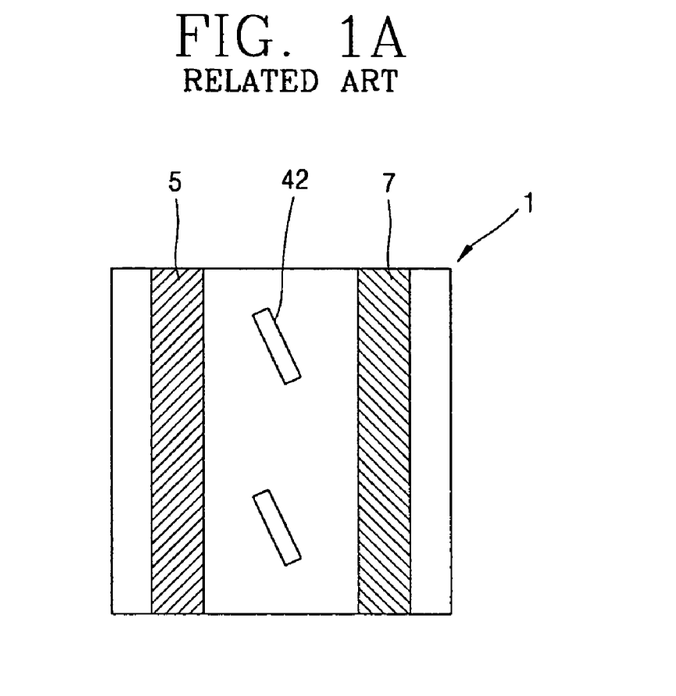
FIGS. 1A and 1B illustrate a related art in-plane switching mode liquid crystal display device.
Figure 1B:
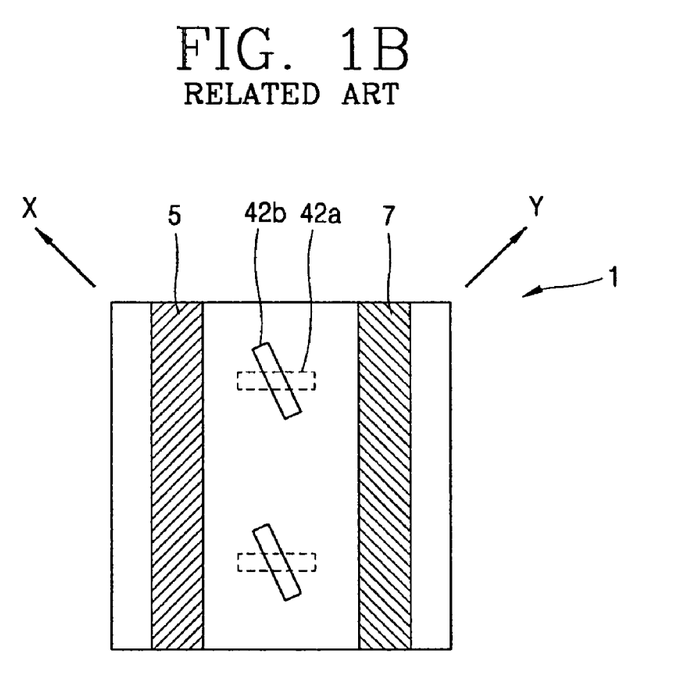

FIGS. 1A and 1B show a related art IPS mode LCD device.

As shown in FIG. 1A, in the PS mode LCD device, a common electrode 5 and a pixel electrode 7 are parallel disposed on the liquid crystal display panel 1, and a rubbing direction of an alignment layer (not shown) on the liquid crystal display panel 1 is formed at a certain angle to the common electrode 5 and the pixel electrode 7. Accordingly, when a voltage is not applied to the pixel electrode 7, the liquid crystal molecules 42 are arranged in the rubbing direction to be aligned at a certain angle to the common electrode 5 and the pixel electrode 7.

When a voltage is applied to the common electrode 5 and the pixel electrode 7, a horizontal electric field that is substantially in parallel with the surface of the panel 1 is generated between the common electrode 5 and the pixel electrode 7. Accordingly, as shown in FIG. 1B, the liquid crystal molecules 42 are aligned in a direction substantially perpendicular to the common electrode 5 and the pixel electrode 7.

Namely, when the voltage is applied thereto, the liquid crystal molecules 42 are rotated in the same plane along with the horizontal electric field, and as a result a gray inversion caused by the refractive anisotropy of the liquid crystal molecules can be effectively prevented.

In the IPS mode LCD device, however, there is disadvantage in that color is shifted according to the direction of the viewing angle. Not shown in Figure, the common electrode 5 and the pixel electrode 7 are formed on a first substrate (i.e., the TFT substrate on which a thin film transistor is formed) of the liquid crystal display device. When a voltage is applied thereto, therefore, the liquid crystal molecules 42a near the first substrate are aligned to be perpendicular to the common electrode 5 and the pixel electrode 7 by the horizontal electric field, while the liquid crystal molecules 42b near a second substrate (i.e., the color filter substrate on which a color filter is formed) are aligned at a certain angle to the common electrode 5 and the pixel electrode 7. That is, the liquid crystal molecules 42a, 42b are twisted from the first substrate to the second substrate. At this time, since the liquid crystal molecules 42 are twisted in a specific direction, a color shift occurs in directions of viewing angles of X, Y as illustrated in FIG. 1(b), thereby causing deterioration of image quality.

Figure 2A:
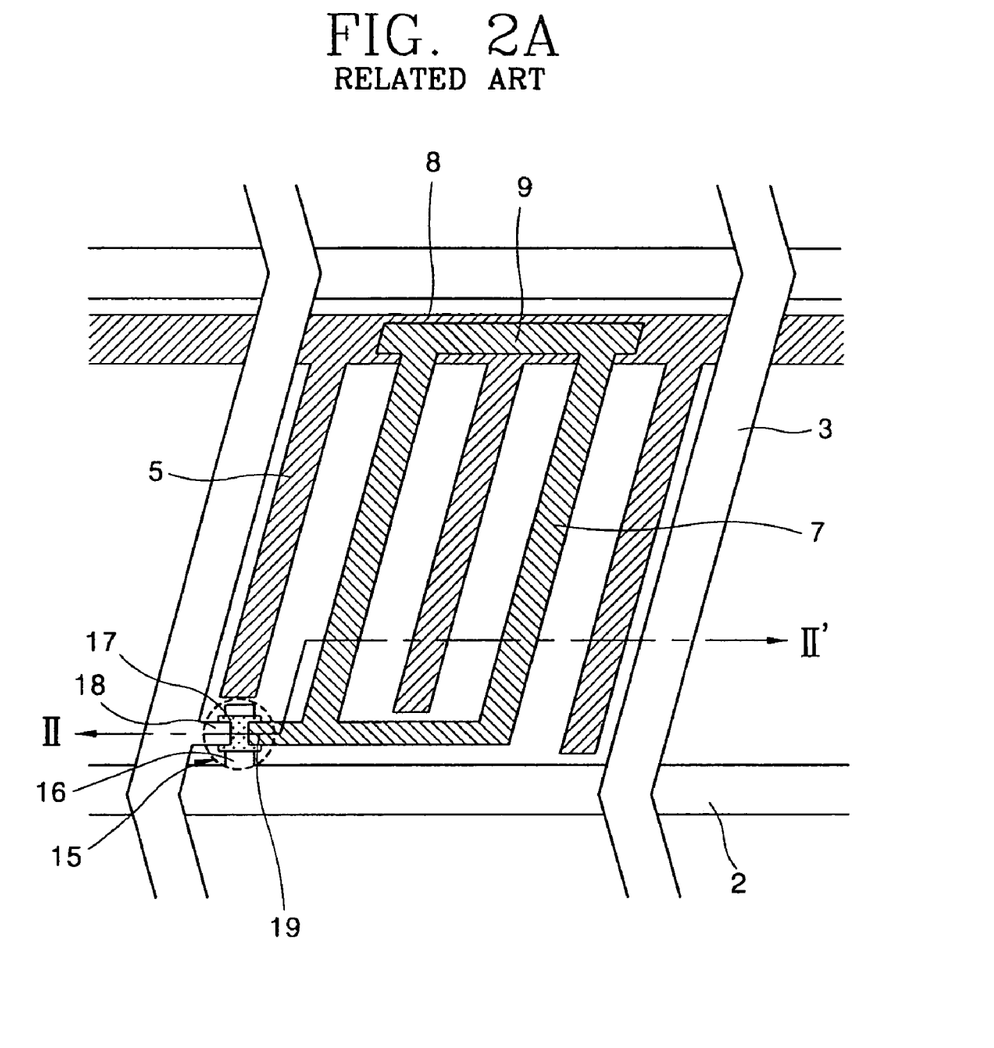
FIG. 2A is a plan view illustrating a structure of the related art in-plane switching mode liquid crystal display device.
Figure 2B:
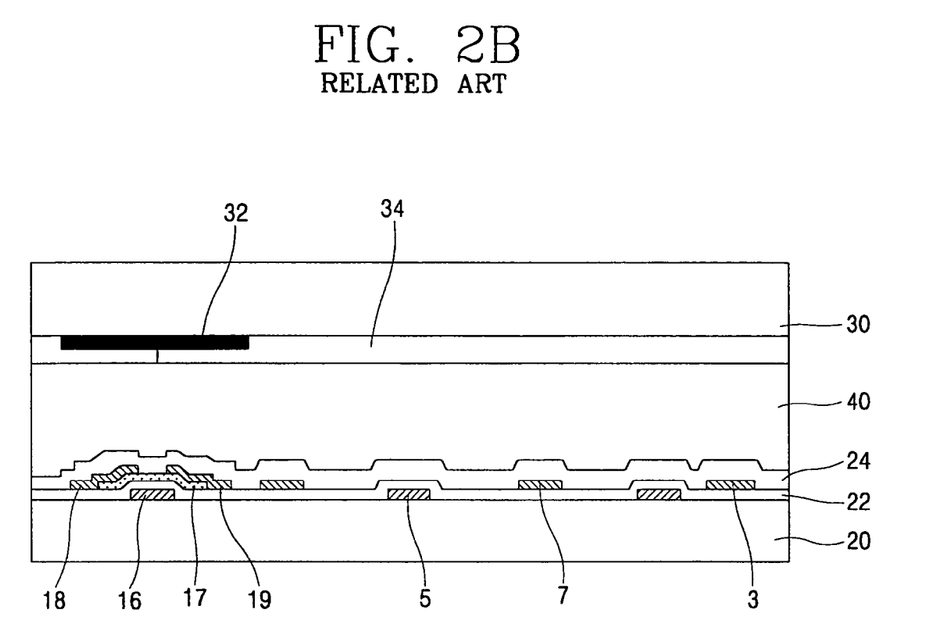
FIG. 2B is a sectional view taken along line II-II' of FIG. 2A.

To solve this problem, an improved IPS mode liquid crystal display device has been introduced. As illustrated in FIGS. 2A and 2B, in the IPS mode liquid crystal display device, a data line 3 is arranged at the certain angle to the gate line 2, that is, not arranged in perpendicular with the gate line 2. Further, the common electrode 5 and the pixel electrode 7 disposed in the pixel region defined by the gate line 2 and the data line 3 are disposed at a certain angle to the gate line 2, that is, the common electrode 5 and pixel electrode 7 are parallel the data line 3. In the pixel, region a common line 8 and a pixel electrode line 9, which are respectively connected to the common electrode 5 and the pixel electrode 7, are overlapped to generate the storage capacitance.

A thin film transistor 15 including a gate electrode 16, a semiconductor layer 17, a source electrode 18 and a drain electrode 19 is disposed near the crossing of the gate line 2 and the data line 3. A signal from the outside is applied through this film transistor 15 to the pixel electrode 7 to generate the horizontal electric field in the liquid crystal layer. Because the liquid crystal molecules are rotated in the same plane along with the horizontal electric field, the gray inversion caused by the refractive anisotropy can be prevented.

The related IPS mode LCD device having the above structure will be described in more detail accompanying with FIG. 2B.

As shown in FIG. 2B, a gate electrode 16 is formed on a first substrate 20, and a gate insulating layer 22 is deposited over the first substrate 20. A semiconductor layer 17 is formed on the gate insulating layer 22, and the source electrode 18 and the drain electrode 19 are formed on the semiconductor layer 17. Further, a passivation layer 24 is formed over the first substrate 20.

In addition, a plurality of common electrodes 5 is formed on the first substrate 20, and the pixel electrode 7 and the data line 3 are formed on the gate insulating layer 22, so that the horizontal electric field may be applied between the common electrode 5 and the pixel electrode 7.

On the second substrate 30, a black matrix 32 and a color filter layer 34 are formed. The black matrix 32 is for shielding the light transmitting the area where the liquid crystal molecules are not operated. The black matrix 32 is mainly formed on the thin film transistor 10 and on the area between pixels (that is, gate line area and a data line area), as illustrated in FIG. 2B. The color filter layer 23 includes R (Red), B (Blue), G (Green) colors for implementing actual colors.

A liquid crystal layer 40 is formed between the first substrate 20 and the second substrate 30.

Figure 3:
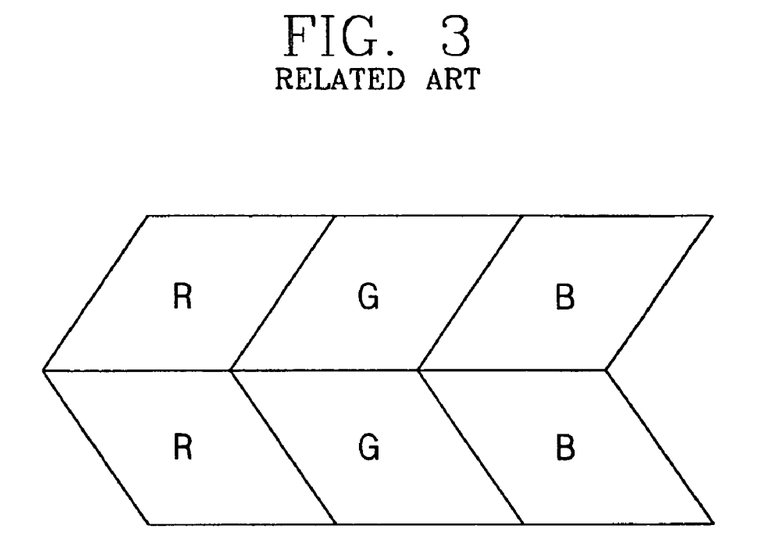
FIG. 3 is a schematic view illustrating the arrangement of pixels of the related art in-plane switching mode liquid crystal display device.

In the related art IPS mode liquid crystal display device, the data line 3, the common electrode 5 and the pixel electrode 7 are disposed at the predetermined angle to the gate line 2. At this time, in the pixels adjacent to the corresponding pixel, especially, the pixels positioned at the upper and lower area of the corresponding pixel, the data line 3, the common electrode 5, the pixel electrode 7 are disposed at a certain angle with the gate line 2. However, these adjacent pixels are symmetric with the corresponding pixel. Accordingly, as shown in FIG. 3, the pixels are disposed in a zigzag shape in a longitudinal direction of the data line 3. In FIG. 3, we will omit the detailed structure of the IPS mode liquid crystal display device and shows only the R (Red), G (Green) and B (Blue) pixels defined by the gate line and the data line are, because each pixel has the same structure as the pixel illustrated in FIGS. 2A and 2B.

As illustrated in FIG. 3, because the R, G, B pixels are respectively formed in a zigzag shape, (i.e., the gate line and the data line are formed in a zigzag shape), a horizontal electric field is formed at each R, G, B pixels in a direction different from that of adjacent R, G, B pixels (in a symmetric direction centering around the gate line respectively). Accordingly, the liquid crystal molecules of the corresponding pixels are twisted in the opposite direction with those of the adjacent pixels from the first substrate 20 to the second substrate 30. As a result, the direction of main viewing angle becomes different in each adjacent R, G, B pixels (i.e., the viewing angles in the adjacent R, G, B pixels are symmetric centering around the gate line) to compensate the viewing angle, and thus the color shift can be prevented.

However, the related IPS mode liquid crystal display device of such a structure has following problems.

As illustrated in FIG. 3, in the related art IPS mode liquid crystal display device, the R, B pixels (R, G, B may form one pixel) are repeatedly formed over the entire liquid crystal display device (in other words, the pixel having R, G, B sub-pixels are repeatedly formed over the entire liquid crystal display device). In the R, G, B color filter layers 34 made of the color resist are respectively formed at the R, G, B pixels. Accordingly, because the light having the wave length except for the wave length of the corresponding color is absorbed in each R, G, B pixel, the intensity of light transmitting the color filter layer 34 is weakened, so that the brightness of the liquid crystal display device may be deteriorated.

SUMMARY OF THE INVENTION

Accordingly, the present invention is directed to an in-plane switching mode liquid crystal display device having a four pixel structure that substantially obviates one or more of the problems due to limitations and disadvantages of the related art.

Therefore, an advantage of the present invention is to provide an in-plane switching mode liquid crystal display device capable of improving brightness by being formed in a 4-pixel structure having R, G, B, W pixels.

Another advantage of the present invention is to provide an in-plane switching mode liquid crystal display device capable of improving a viewing angle characteristic by compensating a main viewing angle by arranging pixels in a zigzag form and symmetrically forming common electrodes and pixel electrodes formed in adjacent pixels having the same color.

To achieve these and other advantages and in accordance with the purpose of the present invention, as embodied and broadly described herein, there is provided a first set of pixels of different colors, each of the pixels having a data line along a side thereof and a gate line along a side thereof, wherein one of the pixels is a white (W) pixel; a second set of pixels of different colors, each of the pixels having a data line along a side thereof and a gate line along a side thereof, wherein one of the pixels is a white (W) pixel; wherein the first set of pixels and the second set of pixels is adjacent to each other.

In another aspect of the present invention, an in-plane switching mode liquid crystal display device includes a plurality of R (Red), G (Green), B (Blue) and W (White) pixels defined by a plurality of gate lines and a plurality of data lines; a driving element in the pixel; and at least one pair of electrodes disposed in the pixel to form a horizontal electric field, wherein the R, G, B, and W pixels are arranged in a zigzag pattern in a data line direction, and each of R, G, B, and W pixels is arranged to be symmetric with respect to the gate line to adjacent R, G, B, and W pixels.

In another aspect of the present invention, an in-plane switching mode liquid crystal display device includes a first set of pixels of different colors, each of the pixels having a data line along a side thereof and a gate line along a side thereof, wherein one of the pixels is a white (W) pixel; a second set of pixels of different colors, each of the pixels having a data line along a side thereof and a gate line along a side thereof, wherein one of the pixels is a white (W) pixel; a third set of pixels of different colors, each of the pixels having a data line along a side thereof and a gate line along a side thereof, wherein one of the pixels is a white (W) pixel; and a fourth set of pixels of different colors, each of the pixels having a data line along a side thereof and a gate line along a side thereof, wherein one of the pixels is a white (W) pixel; wherein the first set of pixels and the second set of pixels are adjacent to each other and the third set of pixels and the fourth set of pixels are adjacent to each other and wherein the white pixels are not adjacent to each other.

In the present invention, the data line may be formed in a zigzag shape, and thus a common electrode and a pixel electrode substantially parallel to the data line may also be formed in a zigzag shape.

The foregoing advantages and other features, aspects and advantages of the present invention will become more apparent from the following detailed description of the present invention when taken in conjunction with the accompanying drawings. It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, example of which is illustrated in the accompanying drawings.

The present invention provides the IPS mode liquid crystal display device having the improved viewing angle characteristic and the increased brightness. The viewing angle characteristic is improved by forming symmetrically common electrodes and pixel electrodes in adjacent pixels at a certain angle to a gate line (i.e., forming the common and pixel electrodes in a zigzag form) and thus compensating a color shift. The brightness is improved by the arrangement of a new pixel. That is, the low brightness in the liquid crystal display device is mainly originated in optical absorption in the R, G, B subpixels. Therefore, the present invention provides the liquid crystal display device having the improved brightness by improving a structure of the pixel having these R, G, B subpixels.

The reason of low brightness of the LCD device having R, G, B subpixels is because most of light is absorbed into the R, G, B color filter layers. By changing a pixel structure to decrease an optical absorption ratio, accordingly, the brightness may be improved. In the present invention, the brightness of the LCD device is improved by including the pixel having a W (White) color filter layer. The W color filter layer may transmit most of the light from a backlight of the LCD device, so that the brightness of the LCD device may be improved. When the W color filter layer is formed, the transmittance is improved by about 55%, and thus the brightness of the LCD device is improved by about 40%. At this time, the R, G, B color filter layers implement colors without any problems because of the W color filter layer. This structure of the LCD device is called a 4-pixel structure or a 4-color filter structure. On the assumption that the pixel has a plurality of sub-pixels (i.e., R, G, B subpixels) for implementing colors, further, the structure may be called the 4-subpixel structure. In other words, the pixel to be explained hereafter means the subpixel and one group of four pixels means one pixel having four subpixels.

Figure 4:
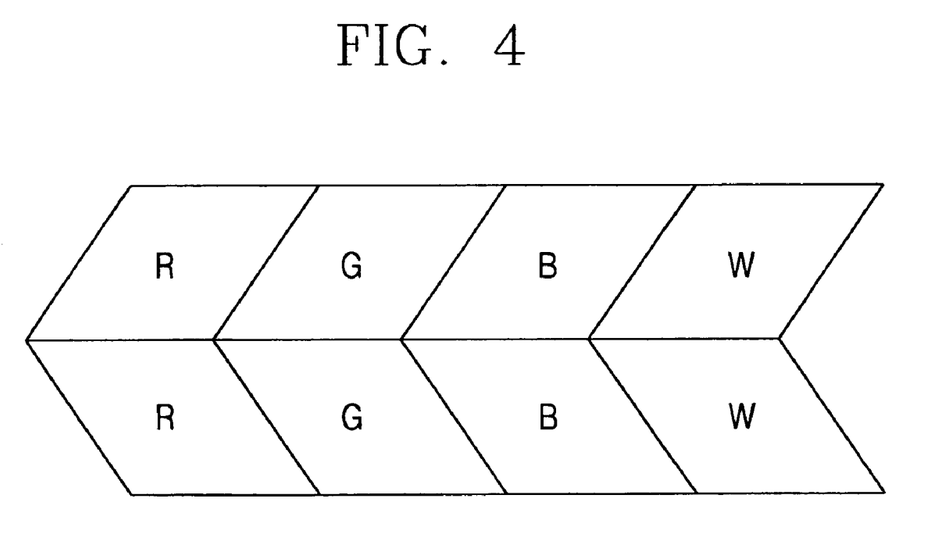
FIG. 4 is a schematic view illustrating the arrangement of pixels of an in-plane switching mode liquid crystal display device having a 4-pixel structure in accordance with the present invention.

FIG. 4 is a schematic view showing a basic structure of the IPS mode LCD device having the 4-pixel structure. As illustrated in FIG. 4, in the IPS mode LCD device four pixels of R, G, B, W are disposed in a stripe structure along the gate line. Each of R, G, B, W pixels is formed in a zigzag shape along the data line, and the liquid crystal molecules thereof are twisted in an opposite direction to the liquid crystal molecules of the adjacent R, G, B, W pixels so that the main viewing angles thereof become different. Accordingly, the main viewing angle is compensated at each R, G, B, W pixel. However, in this IPS mode LCD device, the W pixel whose brightness is more than two times as strong as that of other pixels are disposed in a row in the longitudinal direction, thereby generating a vertical line on a screen.

Figure 5A:
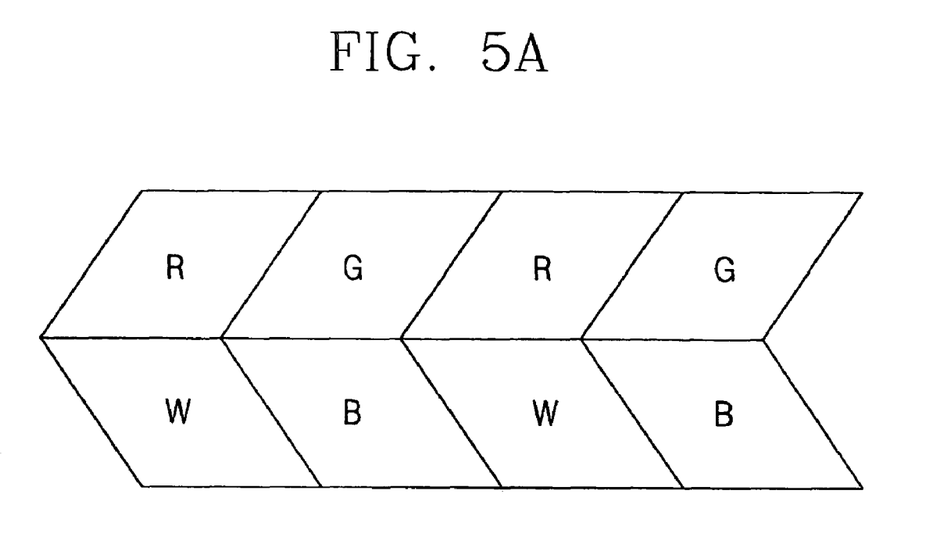
FIGS. 5A and 5B are schematic views illustrating different arrangements of pixels of an in-plane switching mode liquid crystal display device having a 4-pixel structure in accordance with the present invention.

In order to prevent the vertical line from occurring, it is important to arrange the pixels so that the W pixels are not arranged in a row. FIG. 5A illustrates the IPS mode LCD device having the structure that the W pixels are not disposed in a row. As illustrated in FIG. 5A, in this IPS mode LCD device, the W pixels are not disposed in a specific direction, so that a specific line such as a vertical line is not generated on the screen. However, in this IPS mode LCD device, the pixels having the same color filter layers are not adjacently arranged at their upper and lower sides. Namely, a series of R, G, B, W pixels is not formed in zigzag, and the common electrodes and the pixel electrodes (not shown) of the adjacent pixels having the same color are arranged in the same directions. As a result, the viewing angle characteristic cannot be improved.

Figure 5B:
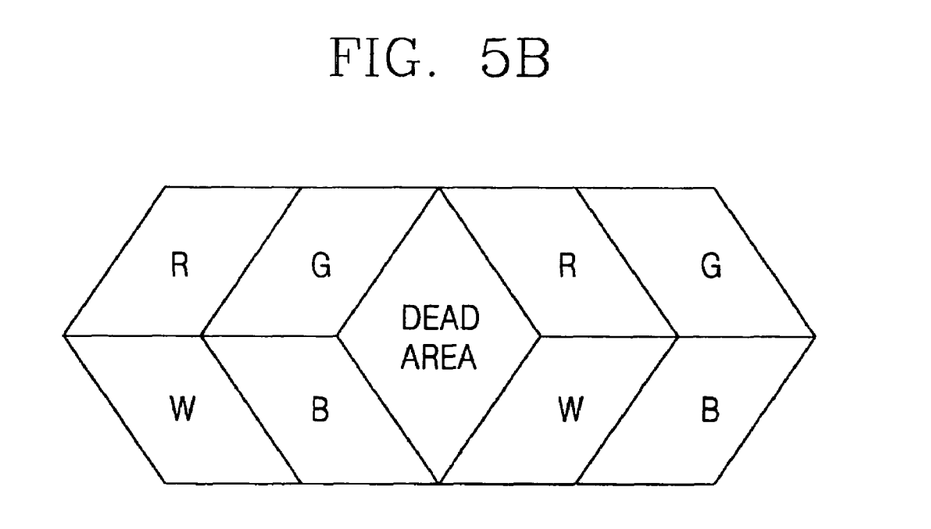

In order to improve the viewing angle characteristic, as illustrated in FIG. 5B, the direction of the series of R, G, B, W pixels (or the pixel having R, G, B, W subpixels) and that of the other series of the R, G, B, W pixels (i.e., the extension directions of the common electrode and the pixel electrode, or the twist directions of the liquid crystal molecules) are oppositely formed, thereby providing the IPS mode LCD device of a 4-pixel structure, in which the main viewing angle has been compensated at each pixel (since the main viewing angles are opposite to each other). However, as illustrated in FIG. 5B, a dead area where the pixel is not formed is generated in the IPS mode LCD device. This dead area is an area where the common electrode or the pixel electrode is not formed and thus the horizontal electric field is not formed. Further, in the dead area, the color filter layer is not formed either. After all, an image is not displayed at the dead region, so that an aperture ratio of the liquid crystal display device is reduced.

Figure 6:
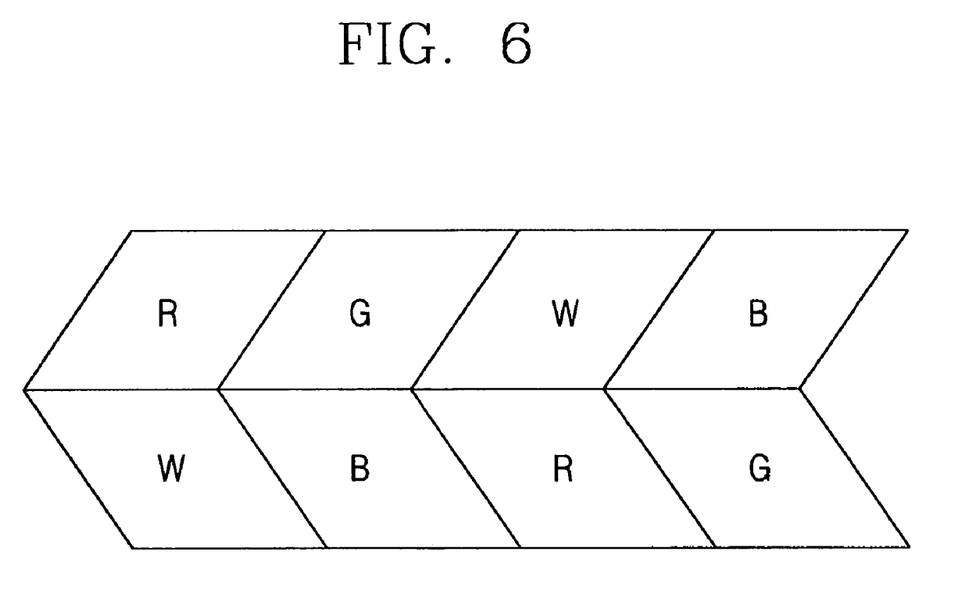
FIG. 6 is a schematic view illustrating another arrangement of pixels of an in-plane switching mode liquid crystal display device having a 4-pixel structure in accordance with the present invention.

FIG. 6 illustrates a basic structure of the IPS mode LCD device having the 4-pixel structure in which the aperture ratio is not reduced and simultaneously the viewing angle characteristic is improved.

As illustrated FIG. 6, in this IPS mode LCD device, a basic structure of a pixel, such as the arrangement of the gate line and the data line and the arrangement of the common electrode and the pixel electrode, is the same as that of the IPS mode LCD device illustrated in FIG. 5A. Accordingly, unlike the IPS mode LCD device illustrated in FIG. 5B, the aperture ratio is not reduced in the IPS mode LCD device of FIG. 6.

The structural difference between the IPS mode LCD device of FIG. 6 and the IPS mode LCD device of FIG. 5A is the arrangement of the pixels. In the IPS mode LCD device of FIG. 5A, a group (or a series) of the R, G, B, W pixels (or the pixel having the R, G, B, W subpixels) has the same pixel arrangement form as the adjacent group of the R, G, B, W pixels (the pixel having the R, G, B, W subpixels). Accordingly, the data lines and the common electrodes and the pixels electrodes in the two pixels having the same color filter layers are arranged in the same directions, and thus the directions of the main viewing angles become the same in those pixels, thereby causing deterioration of the viewing angle characteristic.

On the contrary, in the IPS mode LCD device of the structure of FIG. 6, a group (or a series) of the R, G, B, W pixels (or the pixel having the R, G, B, W subpixels) for implementing the colors has the pixel arrangement different from that of the adjacent group of the R, G, B, W pixels (the pixels having the R, G, B, W subpixels). Particularly, each of R, G, B, W pixels is arranged so that the data lines and the common electrodes and the pixels electrodes in two pixels having the same color filter layers are arranged in the different directions from each other (in symmetrically inclined directions along a gate direction). Accordingly, the main viewing angle is compensated thereby improving the viewing angle characteristic. Hereinafter, the above structure of the IPS mode LCD device having the 4-pixel structure will now be described in more detail.

Figure 7:
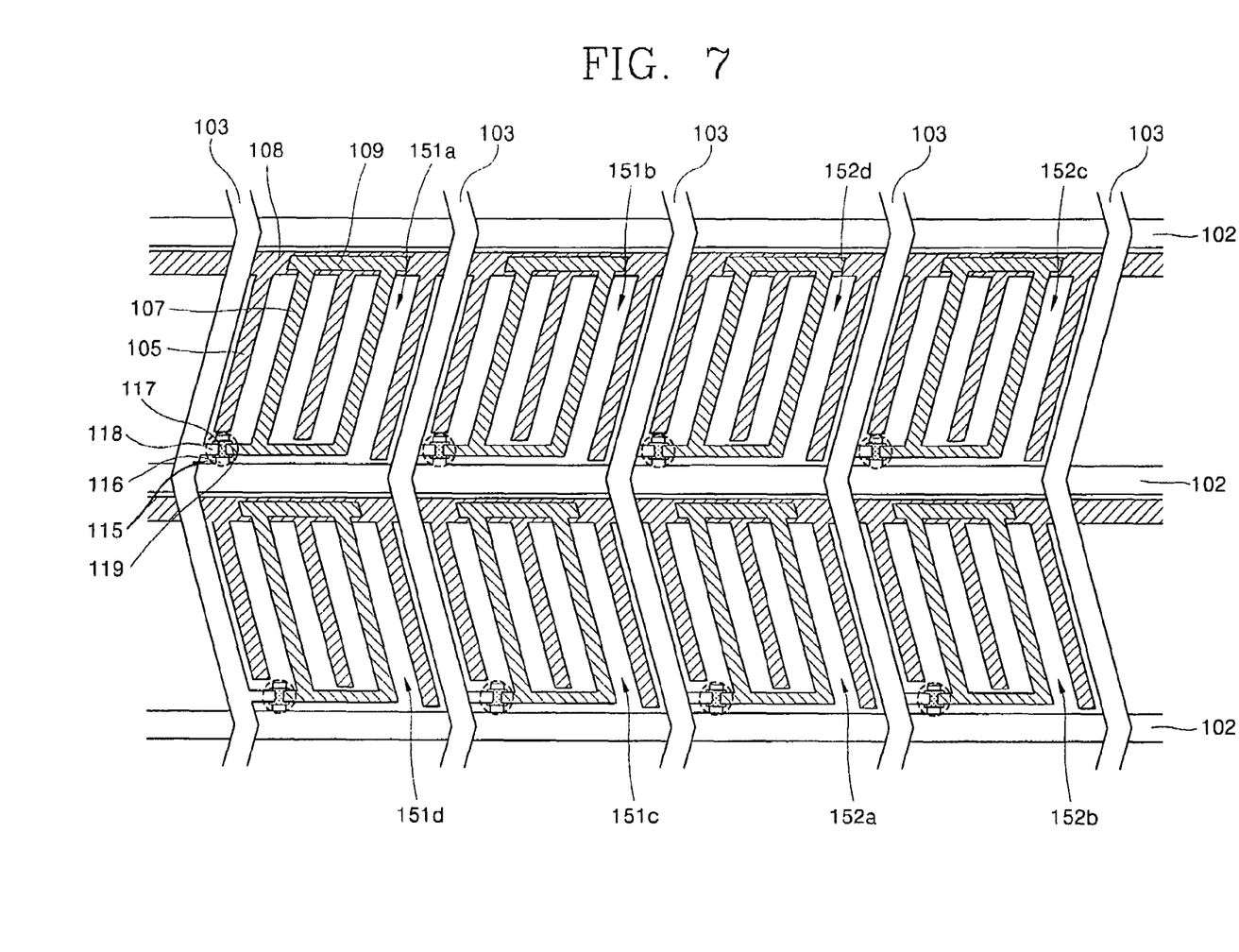
FIG. 7 illustrates a structure of an in-plane switching mode liquid crystal display device having a 4-pixel structure in accordance with the present invention.

FIG. 7 is a plan view illustrating a structure of the IPS mode LCD device having the 4-pixel structure in accordance with one embodiment of the present invention.

As illustrated in FIG. 7, the IPS mode LCD device in accordance with the present invention includes a plurality of pixels 151a-151d and 152a-1152d defined by a plurality of the gate lines 102 and a plurality of the data lines 103 symmetrically arranged centering around the gate lines 102. Common lines 108 may be substantially parallel to the gate lines 102. Thin film transistors 115 are disposed at a region where the gate line 102 and the data line 103 in each pixel cross each other. Each thin film transistor 115 includes a gate electrode 116 connected to a gate line 102 and to which an external scan signal is applied, a semiconductor layer 117 on the gate electrode 116, which may be activated as the scan signal is applied thereto, and a source electrode 118 and a drain electrode 119 on the semiconductor layer and to which an external image signal is inputted through the data line 103.

In each pixel the common electrode 105 and the pixel electrode 107 are disposed to be substantially parallel to the data line 103 and to generate the horizontal electric field. In the drawing, three common electrodes 105 and two pixel electrodes 107 are arranged in each pixel, but the number of the common electrodes and the pixel electrodes are not limited. However, generally, the number of the common electrodes 105 is larger than the number of the pixel electrodes 107 by one to prevent the horizontal electric field from being distorted by the electric field generated between the data line and the pixel electrode 107 and to shield the electric field generated by the data line by disposing the common electrode 105 adjacent to the data line 103.

In addition, by overlapping the common line 108 connected with the common electrode 105 and a pixel electrode line 109 connected with the pixel electrodes 107 within a respective pixel, storage capacity is generated.

The structure of the pixel is substantially the same as that of FIG. 2B. Namely, the gate line and the data line, the thin film transistor, the common electrode and the pixel electrode or the like are formed on the first substrate and the color filter layer and the black matrix are formed at each pixel of the second substrate.

As illustrated in FIG. 7, in the IPS mode LCD device in accordance with the present invention, a group (or a series) of the R, G, B, W pixels (the R, G, B, W subpixels forming one pixel) 151a-151d has a different arrangement from the adjacent group of the R, G, B, W pixels (the R, G, B, W subpixels forming one pixel) 152a-152d. At this time, the R, G, B, W pixels means that the R, G, B, W color filter layers are respectively formed on the second substrate As illustrated in FIG. 7, the R pixel 151a and the G pixel 151b are disposed at the upper part of the first group of pixels 151a-151d, and the B pixel 151c and the W pixel 151d are disposed at its lower part. On the contrary, the B pixel 152c and the W pixel 152d are disposed at the upper part of the second group of the pixels 152a-152d, and the R pixel 152a and the G pixel 152b are disposed at its lower part. That is, the pixels having the same color filter layers are respectively formed at different positions. By such disposition, the common electrodes 105 and the pixel electrodes 107 are formed inclined at a certain angle symmetrically centering around the gate line at each of the R pixels 151a, 152a, G pixels 151b, 152b, B pixels 151c, 152c and W pixels 151d, 152d. Accordingly, the twist directions of the liquid crystal molecules of the two pixels having the same color filter layers become opposite. In the result, the viewing angle characteristic is improved by compensating the main viewing angle directions.

Figure 8:
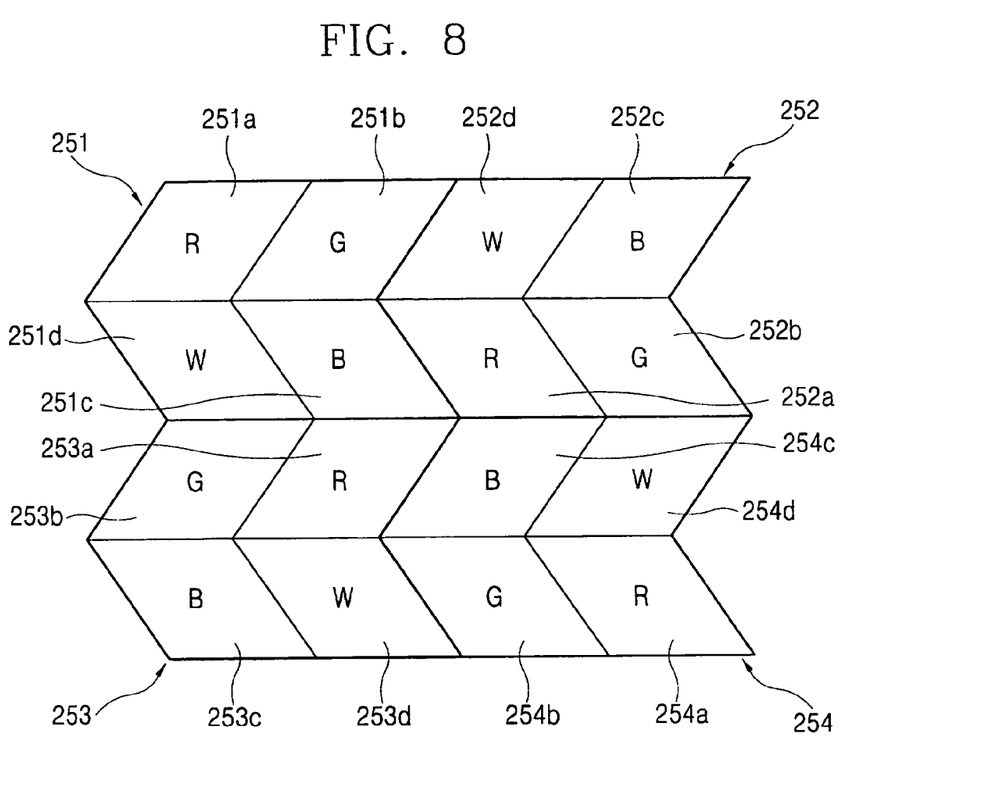
FIG. 8 illustrates an embodiment of the present invention having sixteen pixels arranged according to the present invention.

FIG. 8 illustrates an embodiment of the present invention having sixteen pixels arranged according to the present invention. As illustrated in FIG. 8, in a first set of four pixels formed as the two by two matrix 251 in the upper left of the four by four matrix illustrated, the R pixel 251a and the G pixel 251b are disposed at the upper part of the first group of pixels 251a-251d, and the B pixel 251c and the W pixel 251d are disposed at its lower part. On the contrary, in a second set of four pixels formed by the two by two matrix 252 in the upper right of the four by four matrix illustrated, the B pixel 252c and the W pixel 252d are disposed at the upper part of the second group of the pixels 252a-252d, and the R pixel 252a and the G pixel 252b are disposed at its lower part. That is, the pixels having the same color filter layers are respectively formed at different positions. By such disposition, the common electrodes 105 and the pixel electrodes 107 are formed inclined at a certain angle symmetrically centering around the gate line at each of the R pixels 251a, 252a, G pixels 251b, 252b, B pixels 251c, 252c and W pixels 251d, 252d. Accordingly, the twist directions of the liquid crystal molecules of the two pixels having the same color filter layers become opposite.

In addition, a third set of four pixels formed as the two by two matrix 253 in the lower left of the four by four matrix illustrated, the G pixel 253b and the R pixel 251a are disposed at the upper part of the third group of pixels 253a-253d, and the B pixel 253c and the W pixel 253d are disposed at its lower part. On the contrary, in a fourth set of four pixels formed by the two by two matrix 254 in the lower right of the four by four matrix illustrated, the B pixel 253c and the W pixel 253d are disposed at the upper part of the second group of the pixels 253a-253d, and the R pixel 253a and the G pixel 253b are disposed at its lower part.

In one embodiment of this invention, the configuration of the pixels of upper part of the first set 251 is opposite to the configuration of the pixels of the upper part of the third set 253. For example, as illustrated in FIG. 8, the R pixel 251a is to the left of the G pixel 251b in the first set of pixels 251;

however, the R pixel 253a is to the right of the G pixel 253b in the third set of pixels 253. Similarly, the configuration of the pixels of the lower part of the first set 251 may be opposite to the configuration of the pixels of the lower part of the third set 253. For example, as illustrated in FIG. 8, the W pixel 251d is to the left of the B pixel 251c in the first set of pixels 251; however, the W pixel 253d is to the right of the B pixel 253c in the third set of pixels 253.

The second and fourth sets of pixels 252 and 254 may be similarly configured, as illustrated in FIG. 8. For example, as illustrated in FIG. 8, the W pixel 252d is to the left of the B pixel 252c in the second set of pixels 252; however, the W pixel 254d is to the right of the B pixel 254d in the fourth set of pixels 254. Similarly, the configuration of the pixels of the lower part of the second set 252 may be opposite to the configuration of the pixels of the lower part of the fourth set 254. For example, as illustrated in FIG. 8, the R pixel 252a is to the left of the G pixel 252b in the second set of pixels 252; however, the R pixel 254a is to the right of the G pixel 254b in the fourth set of pixels 254.

As a result, the viewing angle characteristic is improved by compensating the main viewing angle directions because additional brightness is provided by the addition of white pixels, but white lines formed on the screen may be prevented by not placing the white pixels adjacent to each other.

As so far described, since the IPS mode LCD device has the 4-pixel structure of the R, G, B, W subpixels in the present invention, the brightness may be improved. In addition, by arranging pixels in a zigzag along the data line and symmetrically forming the common electrode and the pixel electrode formed in the adjacent pixels of the same color, the main viewing angle is compensated and thus the viewing angle characteristic may be improved.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An in-plane switching mode liquid crystal display device, comprising:
    a plurality of pixels each including R (Red), G (Green), B (Blue) and W (White) subpixels defined by a plurality of gate lines and a plurality of data lines;
    a driving element in each subpixel; and
    at least one pair of electrodes disposed in each subpixel to form a horizontal electric field,
    wherein the R, G, B, and W subpixels of each pixel are arranged in a zigzag pattern in a data line direction, and
    wherein the arrangement of R, G, B, and W subpixels of a pixel is symmetric with respect to the gate line to the arrangement of R, G, B, and W subpixels of an adjacent pixel of the plurality of pixels, and
    wherein each W subpixel of adjacent pixels of the plurality of pixels is not adjacent to another W subpixel.

2. The device of claim 1, wherein the data line has at least one bent portion.

3. The device of claim 1, wherein the electrodes include:
    a common electrode; and
    a pixel electrode arranged to be substantially parallel with the common electrode.

4. The device of claim 3, wherein the common electrode and the pixel electrode have at least one bent portion.

5. The device of claim 1, further comprising:
    a common line connected with a common electrode; and
    a pixel electrode line connected with a pixel electrode in each subpixel, the pixel electrode line overlapping a portion of the common line to form a storage capacitor.

6. The device of claim 1, wherein the driving element is a thin film transistor.

7. The device of claim 1, wherein the R, G, B, and W pixels are substantially parallelograms.

8. An in-plane switching mode liquid crystal display device, comprising:
    a plurality of pixels defined by a plurality of gate lines and a plurality of data lines, each pixel including R (Red), G (Green), B (Blue), and W(White) subpixels;
    a driving element disposed in each subpixel; and
    at least one pair of electrodes disposed in each subpixel to form a horizontal electric field,
    wherein the R, G, B, and W subpixels of each pixel are arranged in a zigzag pattern in a data line direction, the subpixels having the same color of adjacent pixels being arranged in a different direction to compensate a main viewing angle of each of R, G, B, W subpixels,
    and the W subpixels being non-linearly arranged along the data line.

9. The device of claim 8, wherein direction of the electrodes in each of R, G, B, and W subpixels of a pixel is symmetric with respect to the gate line to that of the electrodes in R, G, B, and W subpixels having the same color in an adjacent pixel.

10. An in-plane switching mode liquid crystal display device, comprising:
    a first set of pixels of different colors, each of the pixels having a data line along a side thereof and a gate line along a side thereot wherein one of the pixels is a white (W) pixel, each pixel of the first set of pixels having at least one pair of first electrodes for providing a horizontal electric field therebetween; and
    a second set of pixels of different colors, each of the pixels having a data line along a side thereof and a gate line along a side thereof, wherein one of the pixels is a white (W) pixel, each pixel of the second set of pixels having at least one pair of first electrodes for providing a horizontal electric field therebetween;
    wherein the first set of pixels and the second set of pixels are adjacent to each other and
    wherein the white pixel of the first set and the white pixel of the second set are not adjacent to each other, and
    wherein the first set of four pixels and the second set of four pixels are each arranged in a two by two matrix and wherein the pair of electrodes of pixels in the first set are in a direction from and symmetric about a line perpendicular to the gate line from the pair of electrodes of pixels of the same color in the second set.

11. The in-plane switching mode liquid crystal display device of claim 10, wherein the first set of pixels includes four pixels and the second set of pixels includes four pixels.

12. The in-plane switching mode liquid crystal display device of claim 10, wherein the first set of pixels and the second set of pixels are each arranged in a row.

13. The in-plane switching mode liquid crystal display device of claim 11, wherein the first set of four pixels and the second set of four pixels are each arranged in a row.

14. The in-plane switching mode liquid crystal display device of claim 13, wherein the white pixel of the first set and the white pixel of the second set are not adjacent to each other.

15. The in-plane switching liquid crystal display device of claim 10, wherein the data lines of the first set and the data lines of the second set have a bent portion.

16. The in-plane switching liquid crystal display device of claim 15, wherein the bent portion of the data lines of the first set and the bent portion of the data lines of the second set are symmetric with respect to an axis perpendicular to the gate line.

17. An in-plane switching liquid crystal display device, comprising:
   a first set of pixels of different colors, each of the pixels having a data line along a side thereof and a gate line along a side thereof, wherein one of the pixels is a white (W) pixel; and
   a second set of pixels of different colors, each of the pixels having a data line along a side thereof and a gate line along a side thereof wherein one of the pixels is a white (W) pixel;
   wherein the first set of pixels and the second set of pixels are adjacent to each other;
   wherein the data lines of the first set and the data lines of the second set have a bent portion;
   wherein the bent portion of the data lines of the first set and the bent portion of the data lines of the second set are symmetric with respect to an axis perpendicular to the gate line; and
   wherein a dead space is formed between the first set and the second set.

18. The in-plane switching liquid crystal display device of claim 15, wherein the bent portion of the data lines of the first set and the bent portion of the data lines of the second set are the same direction.

19. The in-plane switching liquid crystal display device of claim 10, wherein the different colors include red, green, blue and white.

20. The in-plane switching liquid crystal display device of claim 19, wherein the first set of pixels includes four pixels and wherein the second set of pixels includes four pixels, and wherein the first set of four pixels and the second set of four pixels are each arranged in a two by two matrix.

21. The in-plane switching liquid crystal display device of claim 20, wherein the two by two matrices of the first set and the second set include an upper row and a lower row, respectively, and wherein the two colors in the upper row of the first set are the same as the two colors in the lower row of the second set.

22. The in-plane switching liquid crystal display device of claim 21, wherein the two colors in the upper row of the first set are arranged the same as the two colors in the lower row of the second set.

23. The in-plane switching liquid crystal display device of claim 11, wherein the two by two matrices of the first set and the second set include an upper row and a lower row, respectively, and wherein the two colors in the lower row of the first set are the same as the two colors in the upper row of the second set.

24. The in-plane switching liquid crystal display device of claim 23, wherein the two colors in the lower row of the first set are arranged in the same pattern as the two colors in the upper row of the second set.

25. An in-plane switching mode liquid crystal display device, comprising:
   a first set of pixels of different colors, each of the pixels having a data line along a side thereof and a gate line along a side thereof, wherein one of the pixels is a white (W) pixel;
   a second set of pixels of different colors, each of the pixels having a data line along a side thereof and a gate line along a side thereof, wherein one of the pixels is a white (W) pixel;
   a third set of pixels of different colors, each of the pixels having a data line along a side thereof and a gate line along a side thereof, wherein one of the pixels is a white (W) pixel; and
   a fourth set of pixels of different colors, each of the pixels having a data line along a side thereof and a gate line along a side thereof, wherein one of the pixels is a white (W) pixel;
   wherein the first set of pixels and the second set of pixels are adjacent to each other and the third set of pixels and the fourth set of pixels are adjacent to each other and wherein the white pixels are not adjacent to each other, and wherein the white pixels of each of the first to fourth sets of pixel are not in a line, and
   wherein the first set of pixels includes four pixels, the second set of pixels includes four pixels, the third set of pixels includes four pixels, and the fourth set of pixels includes four pixels and wherein the first to fourth sets of four pixels are each arranged in a two by two matrix and wherein each pixel contains a pair of electrodes to form a horizontal electric field and wherein the wherein the pair of electrodes of pixels in the first set are in a direction different from and symmetric about a line perpendicular to the gate line from the pair of electrodes of pixels of the same color in the second set.

26. The in-plane switching liquid crystal display device of claim 25, wherein the two by two matrices of the first set and the second set include an upper row and a lower row, respectively, and wherein the two colors in the upper row of the first set are the same as the two colors in the lower row of the second set.

27. The in-plane switching liquid crystal display device of claim 26, wherein the two colors in the upper row of the first set are arranged the same as the two colors in the lower row of the second set.

28. The in-plane switching liquid crystal display device of claim 25, wherein the two by two matrices of the first set and the second set include an upper row and a lower row, respectively, and wherein the two colors in the lower row of the first set are the same as the two colors in the upper row of the second set.

29. The in-plane switching liquid crystal display device of claim 28, wherein the two colors in the lower row of the first set are arranged the same as the two colors in the upper row of the second set.

30. The in-plane switching liquid crystal display device of claim 25, wherein the two by two matrices of the first set and the third set include an upper row and a lower row, respectively, and wherein the two colors in the upper row of the first set are the same as the two colors in the upper row of the third set.

31. The in-plane switching liquid crystal display device of claim 30, wherein the two colors in the upper row of the first set are arranged to be opposite the arrangement of the two colors in the upper row of the third set.

32. The in-plane switching liquid crystal display device of claim 25, wherein the two by two matrices of the first set and the third set include an upper row and a lower row, respectively, and wherein the two colors in the lower row of the first set are the same as the two colors in the lower row of the third set.

33. The in-plane switching liquid crystal display device of claim 32, wherein the two colors in the lower row of the first set are arranged to be opposite the arrangement of the two colors in the lower row of the third set.

34. The in-plane switching liquid crystal display device of claim 25, wherein the two by two matrices of the second set and the fourth set include an upper row and a lower row, respectively, and wherein the two colors in the upper row of the second set are the same as the two colors in the upper row of the fourth set.

35. The in-plane switching liquid crystal display device of claim 34, wherein the two colors in the upper row of the second set are arranged to be opposite the arrangement of the two colors in the upper row of the fourth set.

36. The in-plane switching liquid crystal display device of claim 25, wherein the two by two matrices of the second set and the fourth set include an upper row and a lower row, respectively, and wherein the two colors in the lower row of the second set are the same as the two colors in the lower row of the fourth set.

37. The in-plane switching liquid crystal display device of claim 36, wherein the two colors in the lower row of the second set are arranged to be opposite the arrangement of the two colors in the lower row of the fourth set.

* * * * *